United States Patent
Iannone

(10) Patent No.: US 10,259,175 B2
(45) Date of Patent: Apr. 16, 2019

(54) METHOD FOR MANUFACTURING A COMPOSITE PART FROM A PREIMPREGNATED MATERIAL WITH A SEMI-CRYSTALLINE MATRIX HAVING AN AMORPHOUS SURFACE LAYER

(71) Applicant: ALENIA AERMACCHI S.p.A., Rome (IT)

(72) Inventor: Michele Iannone, Naples (IT)

(73) Assignee: ALENIA AERMACCHI S.p.A., Rome (IT)

( * ) Notice: Subject to any disclaimer, the term of this patent is extended or adjusted under 35 U.S.C. 154(b) by 558 days.

(21) Appl. No.: 14/950,838

(22) Filed: Nov. 24, 2015

(65) Prior Publication Data
US 2016/0144577 A1 May 26, 2016

(30) Foreign Application Priority Data
Nov. 24, 2014 (IT) .............................. TO2014A0963

(51) Int. Cl.
*B29C 70/34* (2006.01)
*B29C 70/44* (2006.01)
(Continued)

(52) U.S. Cl.
CPC ...... *B29C 70/342* (2013.01); *B29C 66/73771* (2013.01); *B29C 66/73773* (2013.01);
(Continued)

(58) Field of Classification Search
None
See application file for complete search history.

(56) References Cited

U.S. PATENT DOCUMENTS 5,264,059 A    11/1993  Jacaruso et al.
2008/0093026 A1*  4/2008  Naumann ............. B29C 70/386
                                                         156/378

(Continued)

FOREIGN PATENT DOCUMENTS

EP      2 109 532 B1    3/2011
WO      WO 2014/088704 A2    6/2014

OTHER PUBLICATIONS

Italian Search Report for corresponding Italian Patent Application No. TO2014A000963 dated Aug. 5, 2015.

(Continued)

*Primary Examiner* — Barbara J Musser
(74) *Attorney, Agent, or Firm* — Merchant & Gould P.C.

(57) ABSTRACT

A method for manufacturing a composite part includes preparing a stack of plies made of a starting material, applying a vacuum bag to the stack of plies, and subjecting the stack of plies to a temperature and pressure cycle in an autoclave. The starting material is a laminate material of resin matrix reinforced with a fiber material. The matrix has a core layer of semi-crystalline thermoplastic resin and a pair of outer layers of amorphous thermoplastic resin arranged on opposite sides of the core layer. The glass transition temperature of the amorphous thermoplastic resin is below the melting point of the semi-crystalline thermoplastic resin. The autoclave temperature cycle heating rapidly the stack of plies to a working temperature above the transition temperature, but below the melting point, keeping the stack of plies at the working temperature during a time period for compaction alone; and cooling the stack of plies.

7 Claims, 1 Drawing Sheet

(51) Int. Cl.
    *B29C 65/00*     (2006.01)
    *B29K 79/00*     (2006.01)
    *B29K 71/00*     (2006.01)
    *B29K 307/04*     (2006.01)
    *B29K 105/00*     (2006.01)
    *B29C 35/02*     (2006.01)

(52) U.S. Cl.
    CPC .......... *B29C 70/44* (2013.01); *B29C 35/0227* (2013.01); *B29K 2071/00* (2013.01); *B29K 2079/085* (2013.01); *B29K 2105/253* (2013.01); *B29K 2307/04* (2013.01)

(56) References Cited

U.S. PATENT DOCUMENTS

2009/0101277 A1\*   4/2009   Cramer ................ B29C 70/386
                                                                 156/265
2010/0170637 A1\*   7/2010   Iannone .................... B32B 7/02
                                                                  156/276

OTHER PUBLICATIONS

R. Pitchumani et al., Design and Optimization of a Thermoplastic Tow-Placement Process with in-situ Consolidation, Journal of Composite Materials, vol. 31, No. 3/1997.
C. Voto et al., Environmental Resistance of Amorphous Bonded Thermoplastic Joints, Advisory Group for Aerospace Research & Development, Reprinted from AGARD Report 785, The Utilization of Advanced Composites in Military Aircraft, North Atlantic Treaty Organization.

\* cited by examiner

METHOD FOR MANUFACTURING A COMPOSITE PART FROM A PREIMPREGNATED MATERIAL WITH A SEMI-CRYSTALLINE MATRIX HAVING AN AMORPHOUS SURFACE LAYER

This application claims benefit of Serial No. TO2014A000963, filed 24 Nov. 2014 in Italy and which application is incorporated herein by reference. To the extent appropriate, a claim of priority is made to the above disclosed application.

BACKGROUND OF THE INVENTION

The present invention relates in general to preimpregnated materials.

As is known, pre-impregnated materials (also commonly known as prepregs) are composite materials used in various industrial sectors, and in particular in the aeronautical industry. A prepreg is generally a semi-finished product comprising reinforcing fibers and a resin matrix in which these fibers are embedded. The fibers may be arranged in different configurations, for example in a unidirectional layer, in two layers having orientations different from each other, or as fabric. Prepregs are generally prepared in the form of strips and wound in rolls.

The preimpregnated materials mainly used in the aeronautical industry have a thermosetting resin matrix which, before polymerization, has tackiness characteristics. They can therefore be used to form laminates by placing various layers on top of each other, with a suitable orientation sequence of various layers. The laminates are then subjected to a temperature and pressure cycle (in a vacuum bag and in an autoclave) which causes the material to polymerize, increasing its molecular weight and promoting the formation of bonds between the macromolecules (crosslinking), transforming it into a material with structural characteristics suitable for working use.

The laminates may also be made using automated methods which involve significant advantages in terms of cost, productivity and repeatability. For flat or moderately curved laminations, an apparatus known as an automatic tape layer is used. Recently, a technique has become established where curved surfaces, including closed (cylindrical) surfaces, may be laminated using preimpregnated strips with a relatively small width (called slits); this technique is known as Automatic Fiber Placement and is already used for composite parts with a thermosetting matrix.

Prepregs with a matrix of thermoplastic material are also used in the aeronautical industry. In the case of prepregs based on thermoplastic materials, the resin has a high molecular weight and therefore, on the one hand, it does not need to be subjected to a polymerization cycle while, on the other hand, it does not have tackiness characteristics. A prepreg with thermoplastic matrix may, as a first approximation, be regarded as an article in its finished state formed by a single lamina. In order to be able to form a laminate, it must be heated so as to cause melting of the thermoplastic preimpregnated plies which form it, compacted under pressure and then allowed to cool. The temperature to be reached for melting is the glass transition temperature $T_g$ for amorphous thermoplastics and the melting point $T_f$ for semi-crystalline thermoplastics.

At present the typical processing technique for composite aeronautical parts with a thermosetting matrix comprises manual or automated lamination of the plies of material followed by application of a vacuum bag and a curing cycle in an autoclave. In the case of thermosetting materials, the curing cycle must ensure both consolidation of the part and its chemical transformation (polymerization and crosslinking). This cycle therefore requires raising of the temperature at a controlled speed (about 2-3° C./min), a period of exposure to high temperature (typically about 2 hours at 180° C.) and cooling. In the case of thermoplastics the aforementioned process is also possible, but in this case heating is required only in order to render the part fluid (above the glass transition temperature $T_g$ for amorphous thermoplastics and above the melting point $T_f$ for semi-crystalline thermoplastics); the pressure is used, as in the case of the thermosetting materials, to consolidate the plies. In the case of semi-crystalline materials, it is necessary to have a very high consolidation temperature (e.g. above 350° C. for composites with a polyether ether ketone (PEEK) matrix) which requires a high temperature in an autoclave, specific materials for the process (heat-resistant vacuum bag film, high-temperature sealing tape, etc.) and therefore involves high costs for energy, equipment and service materials used, etc. The cooling rate must also be controlled in order to ensure that it is within the correct working range, so as to obtain the correct degree of crystallinity.

SUMMARY OF THE INVENTION

One object of the invention is therefore to provide a method for manufacturing a composite part, based on an autoclave treatment cycle, which is technologically less complex and economically less costly than the known processes.

This object is achieved according to the invention by a method for manufacturing a composite part, comprising the following steps:
  preparing a stack of plies made of a starting material,
  applying a vacuum bag to the stack of plies, and applying vacuum within the vacuum bag, and
  subjecting the stack of plies to a temperature and pressure cycle in an autoclave;
  wherein said starting material is a laminate material comprising a resin matrix reinforced with a fiber material, wherein the matrix comprises a core layer of semi-crystalline thermoplastic resin having a melting point $T_f$, and a pair of outer layers arranged on opposite sides of the core layer, each outer layer consisting of amorphous thermoplastic resin having a glass transition temperature $T_g$, wherein the glass transition temperature $T_g$ of the amorphous thermoplastic resin is below the melting point $T_f$ of the semi-crystalline thermoplastic resin, and
  wherein the temperature and pressure cycle in an autoclave comprises:
  applying pressure in an increasing manner until a working pressure $p_w$ is reached, and rapidly heating the stack of plies until a working temperature $T_w$ which is above the glass transition temperature $T_g$ of the amorphous thermoplastic resin but below the melting point $T_f$ of the semi-crystalline thermoplastic resin is reached,
  keeping the stack of plies at the working temperature $T_w$ during a time period for compaction alone, and
  cooling the stack of plies and releasing the pressure after the temperature has dropped below the glass transition temperature $T_g$ of the amorphous thermoplastic resin.

The starting material used in the method according to the invention and some possible methods for production of this material are described in the publication EP 2 109 532 in the name of the same Applicant. The description, contained in EP 2 109 532, of the material and the associated production methods is cited herein by way of a reference source.

The method according to the invention does not have excessively demanding operational requirements since it is required to reach, for compaction and therefore for formation of the laminate, only the glass transition temperature $T_g$ of the layer based on amorphous thermoplastic; moreover, since usually this amorphous layer, and not the layer based on semi-crystalline thermoplastic, is melted in the process, it is not required to control the cooling speed.

BRIEF DESCRIPTION OF THE DRAWINGS

Preferred but non-limiting embodiments of the invention will now be described, with reference to the accompanying drawings in which.

DETAILED DESCRIPTION OF THE PREFERRED EMBODIMENTS

Figure 1:
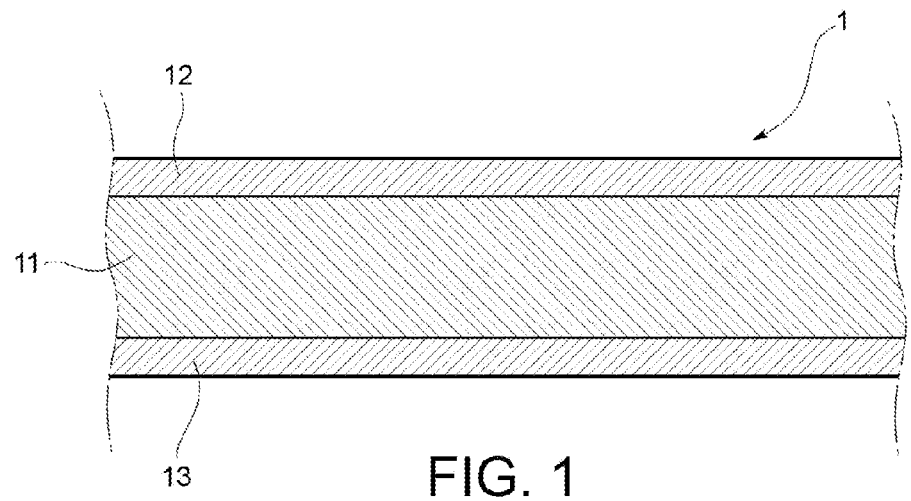
FIG. 1 shows a schematic cross-sectional view of a prepreg used as starting material for the method according to the invention.

With reference to FIG. 1, a prepreg 1 to be used as starting material for the method according to the invention is shown in schematic form. This prepreg 1 consists of a laminate material comprising a matrix based on resin reinforced with a fiber material. The fiber material may be composed of fiber of any type known in the sector, for example glass fiber, carbon fiber, or a combination of these. Moreover, the fibers may be arranged in different configurations, for example in a unidirectional layer, in several layers having orientations different from each other, or as fabric. In any case, the composition and the arrangement of the fibers are not essential for the purposes of the invention.

The matrix of the prepreg 1 according to the invention comprises a core layer 11 of semi-crystalline thermoplastic resin having a melting point $T_f$. This semi-crystalline thermoplastic resin is for example polyether ether ketone, or PEEK, which has a melting point $T_f$ of about 350° C. A respective outer layer 12, 13 of amorphous thermoplastic resin having a glass transition temperature $T_g$ is applied on each of the opposite sides of the core layer 11, the glass transition temperature $T_g$ of the amorphous thermoplastic resin being below the melting point $T_f$ of the semi-crystalline thermoplastic resin. This amorphous thermoplastic resin is for example poly(ether imide), or PEI, which has a glass transition temperature $T_g$ of about 200° C.

A preferred example of a prepreg of the type described above is a prepreg in which the fiber is a carbon fiber of the Intermediate Module or Intermediate Strength type (for example AS4 or IM7), and the matrix is of the thermoplastic resin type obtained by placing a PEEK film between two PEI films. Even more preferably, the prepreg has a thickness of about 0.250 mm with a percentage by weight of thermoplastic resin equal to about 37% of the overall weight of the prepreg, and a weight per unit area of the carbon fiber of about 290 g/m², the matrix being obtained from a PEEK film having a thickness of about 0.080 mm and from two PET films each having a thickness of about 0.020 mm. The selection of these film thicknesses is particularly preferred since it is able to achieve a semi-crystalline/amorphous distribution which represents a compromise between the need to reduce the amorphous part to the minimum for preserving the structural properties, and the need to have a sufficient quantity for good adhesion between the prepregs in the lamination process.

The aforementioned material may be produced for example using one of the methods described in the publication EP 2 109 532. The first of these methods described envisages that a strip of semi-crystalline thermoplastic resin film and two strips of amorphous thermoplastic resin film are respectively supplied from respective rolls. These strips are passed inside a heating chamber where they are heated to a temperature above the melting point $T_f$ of the semi-crystalline thermoplastic resin and where they are compacted using rolls into a single film. Immediately after compaction the strip of high-temperature film is transported into a constant-temperature zone where it encounters reinforcing fibers which are supplied in the form for example of fabric yarns or a strip of fabric. The multi-layer resin film is made to penetrate between the fibers by means of hot rolling Immediately after interpenetration between fiber and resin (impregnation) the article (strip of reinforced film) is cooled in a controlled manner to avoid amorphization of the semi-crystalline thermoplastic resin.

The second of the methods described in EP 2 109 532 envisages that a strip of semi-crystalline thermoplastic resin film reinforced with fiber material and two strips of amorphous thermoplastic resin film are respectively supplied. This production method is similar to that described above, except for the fact that it is not required to supply fiber material, this being already present in the strip of semi-crystalline thermoplastic resin film.

Figure 2:
FIGS. 2 and 3 are schematic representations which show different operative steps of the method according to the invention.
Figure 3:
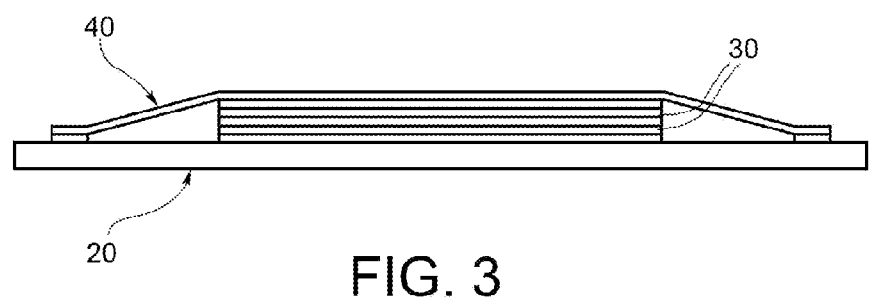

With reference to FIGS. 2 and 3, a method for manufacturing a composite part according to the invention is now described.

A stack of plies 30 is formed in a manner known per se on a tool 20 configured according to the production requirements. Each ply 30 is formed by a part made of the preimpregnated material 1 described above. Consequently, each ply 30 makes contact with an adjacent ply 30 by means of respective outer layers 12, 13 of amorphous thermoplastic resin. Optionally, with regard to the preparation of the stack of plies 30, it is possible to heat-weld at least some of the plies 30 to each other at local points of the latter. This may be convenient in order to obtain greater stability of the stack during processing. The heat-welding process envisages applying heat to local points of the plies so that at these points a temperature above the glass transition temperature $T_g$ of the amorphous thermoplastic resin, but below the melting point $T_f$ of the semi-crystalline thermoplastic resin, is reached.

A vacuum bag 40 is then applied, in a manner conventional per se, to the stack of plies 30 within which a vacuum is created. The pressure inside the vacuum bag may be for example about 0.2 atm.

The stack of plies 30 with the vacuum bag 30 is then subjected to a temperature and pressure cycle in an autoclave. With regard to this cycle, the pressure inside the autoclave may be set to a value of a few atmospheres, in a similar manner to that which occurs for processes which use conventional thermosetting materials. In particular, the pressure is raised to a working pressure $p_w$ of a few atmospheres, which is reached before or during heating of the stack of plies, and then maintained until the end of the process.

As regards the temperature inside the autoclave, it is envisaged that initially the stack of plies 30 is heated rapidly to a working temperature $T_w$ above the glass transition temperature $T_g$ of the amorphous thermoplastic resin, but below the melting point $T_f$ of the semi-crystalline thermoplastic resin. The term "rapidly" is understood as meaning that the rate of increase of the temperature during heating of the temperature and pressure cycle is greater than that which is generally applied in the case of conventional thermosetting materials, in particular higher than 3° C./min, or even much higher than 3° C./min. More specifically, it is possible to preset the process so that heating occurs with the maximum rate of increase of the temperature permitted by the plant, with a consequent substantial reduction in the process times.

Following heating, the stack of plies 30 is kept at the working temperature $T_w$ for a period of time sufficient for compaction of the material. In fact, unlike in the case of thermosetting materials, the autoclave treatment is not required to produce a chemical transformation of the material, but only a compaction of the plies, as required for conventional thermoplastics. In particular, the time interval for compaction alone during the temperature and pressure cycle is shorter than 30 minutes, for example about 10 minutes.

The stack of plies 30 is therefore compacted at a temperature which is relatively low, but in any case sufficient to cause melting solely of the amorphous resin layers and thus obtain tackiness of the preimpregnated laminae, while there is no melting of the semi-crystalline resin layer and therefore no problems which could be associated with this melting process and consequent control of the cooling speed occur.

Finally, the stack of plies 30 is cooled. As explained above, the cooling step does not require any particular control, since the only part to have undergone transformation is the amorphous part of the layers 12 and 13 of each ply 30.

With cooling of the stack the pressure is also naturally released; in particular, the pressure is released after the temperature has dropped below the glass transition temperature $T_g$ of the amorphous thermoplastic resin. Finally, removal of the vacuum bag is performed, in order to allow any further processing of the composite part thus obtained.

Comparing a composite obtained from a prepreg produced as described in the above-mentioned example with a composite obtained from a conventional prepreg with PEEK and carbon fiber, for a given fiber weight per unit area and resin content, the mechanical properties of the composite obtained from the prepreg according to the invention (tension, compression, in-plane shear, open-hole tension and compression, compression after impact) are substantially equivalent to those of the composite obtained from the conventional prepreg, with the exception of the interlaminar shear properties which, for the composite obtained from the prepreg according to the invention, are no less than 90% of the interlaminar shear properties of the composite obtained from the conventional prepreg.

Moreover, from the production point of view, the process is greatly simplified since it is necessary to reach, for compaction, a relatively low temperature (temperature higher than the $T_g$ of the amorphous thermoplastic, by a sufficient amount to ensure its transition and permit tackiness), in any case lower than the temperature to be reached for the conventional semi-crystalline thermoplastic prepreg.

Moreover, for the conventional semi-crystalline thermoplastic prepreg, it is necessary to control the cooling temperature, whereas this is not necessary for the prepreg according to the invention.

The invention claimed is:

1. A method for manufacturing a composite part, comprising the following steps:
   preparing a stack of plies, said stack comprising a plurality of plies, each of the plurality of plies being made of a starting material;
   applying a vacuum bag to the stack of plies, and applying vacuum within the vacuum bag; and
   subjecting the stack of plies to a temperature and pressure cycle in an autoclave;
   wherein said starting material is a laminate material comprising a resin matrix reinforced with a fiber material, wherein the matrix comprises a core layer of semi-crystalline thermoplastic resin having a melting point, and a pair of outer layers arranged on opposite sides of the core layer, each outer layer consisting of amorphous thermoplastic resin having a glass transition temperature, wherein the glass transition temperature of the amorphous thermoplastic resin is below the melting point of the semi-crystalline thermoplastic resin;
   wherein adjacent plies of the plurality of plies make contact with each other by the respective outer layers of amorphous thermoplastic resin; and
   wherein the temperature and pressure cycle in an autoclave comprises:
   applying pressure in an increasing manner until a working pressure is reached, and rapidly heating the stack of plies until a working temperature which is above the glass transition temperature of the amorphous thermoplastic resin but below the melting point of the semi-crystalline thermoplastic resin is reached;
   keeping the stack of plies at the working temperature during a time period for compaction alone; and
   cooling the stack of plies and releasing the pressure after the temperature has dropped below the glass transition temperature of the amorphous thermoplastic resin.

2. The method according to claim 1, wherein the rate of increase of the temperature during heating of the temperature and pressure cycle is greater than 3° C./min.

3. The method according to claim 1, wherein the time period for compaction alone during the temperature and pressure cycle is shorter than 30 minutes.

4. The method according to claim 1, wherein preparing the stack of plies comprises heat-welding at least some of the plies to one another at local points of the plies.

5. The method according to claim 1, wherein said semi-crystalline thermoplastic resin is polyether ether ketone.

6. The method according to claim 1, wherein said amorphous thermoplastic resin is poly(ether imide).

7. The method according to claim 1, wherein said fiber material comprises carbon fibers.

* * * * *